Nov. 22, 1966    M. G. ANDERSON    3,286,759

TIRE

Filed April 15, 1965    3 Sheets-Sheet 1

INVENTOR.
MALCOLM G. ANDERSON

BY

*J B Holden*
ATTORNEY

Nov. 22, 1966  M. G. ANDERSON  3,286,759
TIRE
Filed April 15, 1965  3 Sheets-Sheet 2
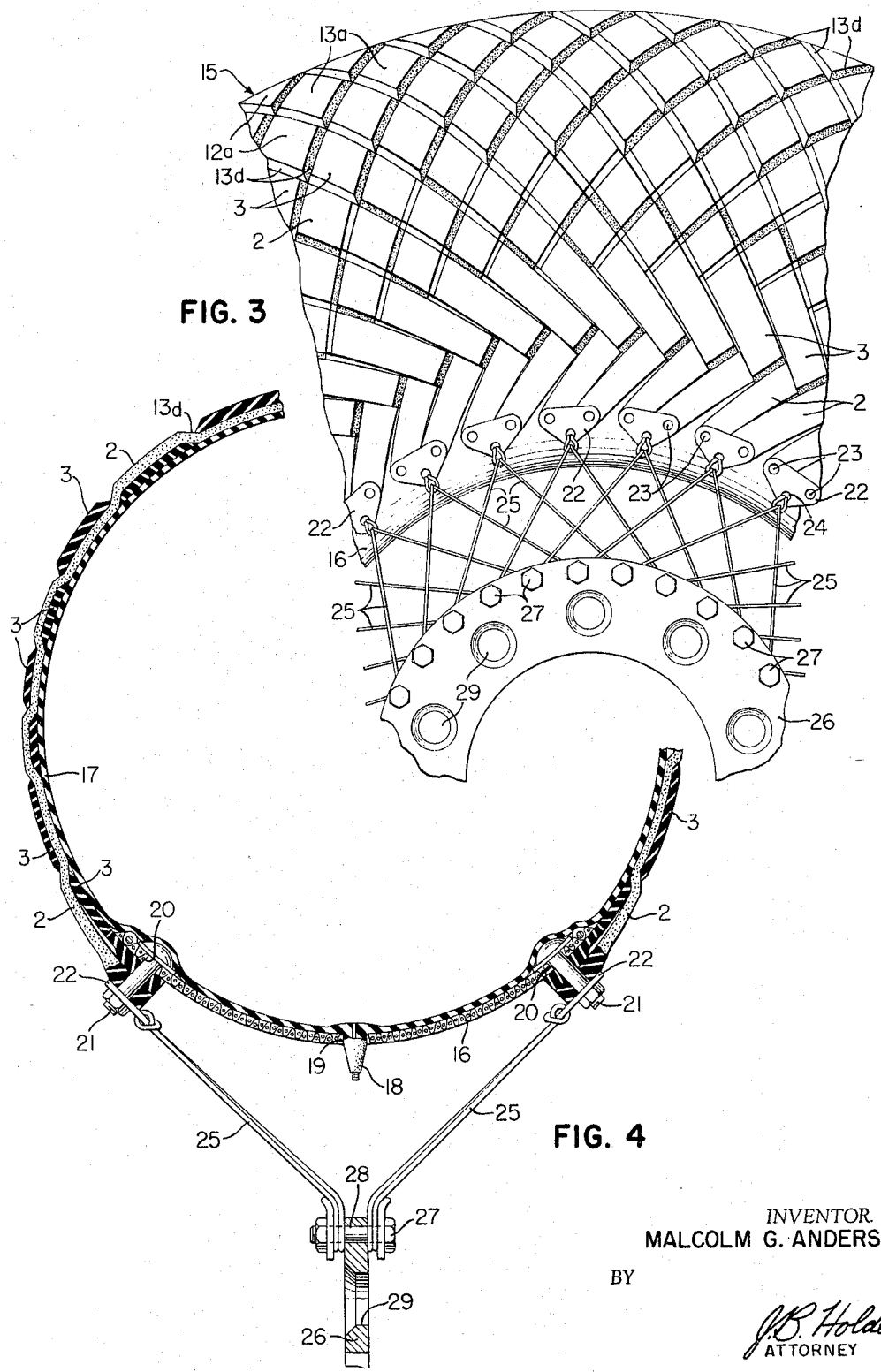
INVENTOR.
MALCOLM G. ANDERSON
BY
J.B. Holden
ATTORNEY Nov. 22, 1966  M. G. ANDERSON  3,286,759
TIRE
Filed April 15, 1965  3 Sheets-Sheet 3

INVENTOR.
MALCOLM G. ANDERSON
BY
J.B. Holden
ATTORNEY

United States Patent Office 3,286,759
Patented Nov. 22, 1966

3,286,759
TIRE
Malcolm G. Anderson, Bradenton, Fla., assignor to The Goodyear Tire & Rubber Company, Akron, Ohio, a corporation of Ohio
Filed Apr. 15, 1965, Ser. No. 448,368
14 Claims. (Cl. 152—358)

This invention relates to dismemberable pneumatic tires having the outer casing made up of strips, flexible elastomeric material or other suitable material braided or interwoven to form a cover for an inflatable inner tube.

This tire is particularly useful on very large vehicles such as earth movers, salvage or exploratory vehicles where size of the tire required is so large that it is impractical to manufacture it as a molded unitary structure because of the difficulty in shipping such a large object and because of the size and expense of the equipment required to produce such a tire.

It is known in the prior art to produce tires having wire mesh or other strips of material interwoven to form an outer casing for an inflatable inner tube. The prior art also shows the use of reinforcing cords which can be removed individually from the tire when they become damaged and which can be replaced without disturbing the remaining tire cords.

In many instances such interwoven structures were designed to protect the tire from punctures by preventing sharp objects from passing through the tire and tube. In other prior art patents the purpose of the structure was to facilitate repair of the tire by making it convenient to replace part of the reinforcing cords.

The present invention differs from the prior art both in the structure of the tire and in the problem being solved by the invention. The present invention, unlike the prior art, is concerned with the problem of providing very large tires which if molded as one integral unit would require molds of such size that the cost would be prohibitive and the space requirements for a building to house such molds would be very costly and impractical. Such a tire would also be too large to ship by conventional means of transportation. The tire of this invention is constructed of molded units such as strips of elastomeric material, while the prior art teaches the use of interwoven wires, fabric strips or cords which are used more as a wear and puncture resistant shield for the tire rather than a means of making a very large tire in small "modular" strips or sections to facilitate the molding, transportation and repair of such tire and to vary the size of the tire by varying the number of strips used.

The term "modular," as used in this application, describes an interchangeable part or small unit which is used repeatedly throughout a complete structure such as the tire of this invention and which does not lose its identity, but can be removed from the complete structure and replaced by another part of identical design.

A primary object of the present invention is to provide a pneumatic tire which can be manufactured in small modular sections or strips and transported to the area where it will be used and then assembled and installed on a vehicle.

Another object of the invention is to provide a tire for very large vehicles without the expense of large curing molds that would normally be required to cure a tire of such proportions.

Another object of this invention is the provision of modular strips from which tires of many different sizes can be made from the same size strips by merely increasing or decreasing the number of strips used in the tire.

A still further object of the invention is to facilitate the repair of very large tires by making it possible to remove and replace the damaged modular segments of the tire without the need for any curing operation at the sight where the tire is being repaired.

These and other objects and advantages of this invention will appear more fully as the description proceeds in the following specification and the accompanying drawings in which:

FIG. 3 is a segmental view of the side of a tire showing another embodiment of the invention;

FIG. 4 is a sectional view taken through the tire shown in FIG. 3 normal to the edge of one of the molded strips;

Figure 1:
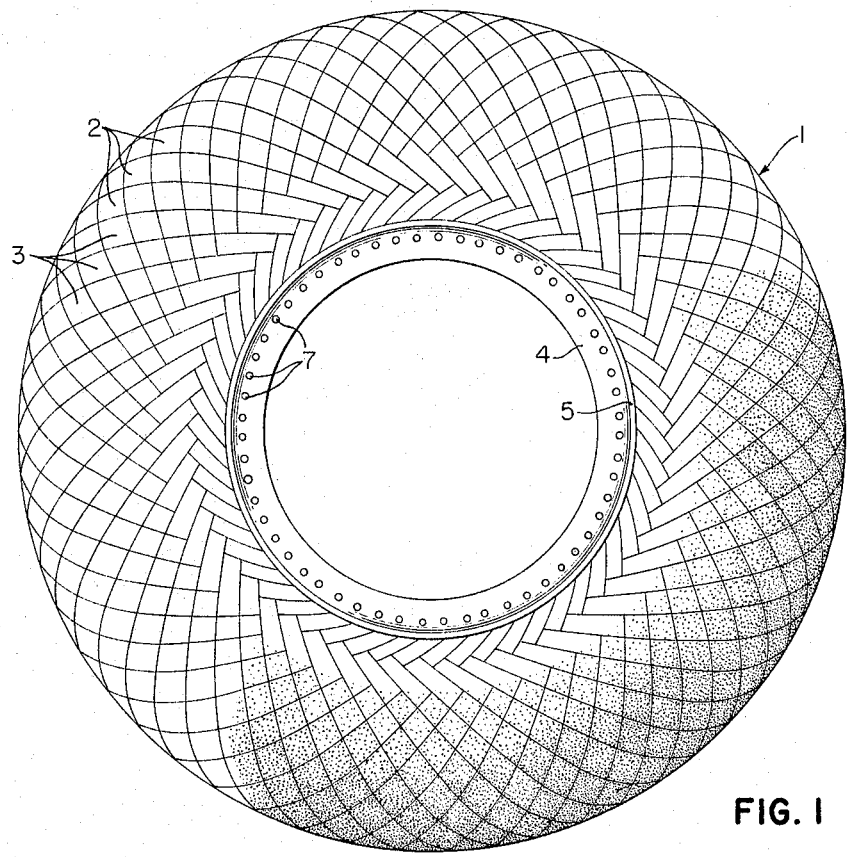
FIG. 1 is a side view of a tire and rim illustrating one embodiment of the invention.
Figure 2:
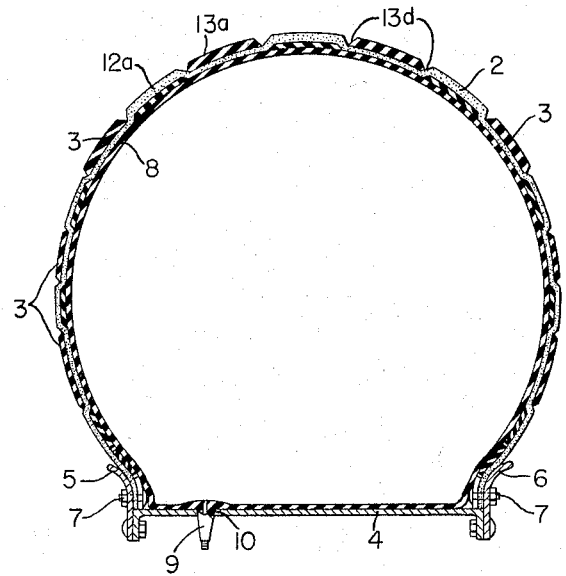
FIG. 2 is a sectional view taken through the tire shown in FIG. 1 normal to the edge of one of the molded strips.

Referring to the drawings and in particular to FIGS. 1 and 2, the numeral 1 indicates generally a tire made from a plurality of flexible elastomeric strips 2 interwoven in a basket weave pattern with a plurality of strips 3 similar to the strips 2 but of opposite contour. Preferably, the strips 2 and 3 are longitudinally reinforced with parallel nylon cords or other suitable material. The strips 2 are shown in detail in FIGS. 5 and 6. The strips 3 are shown in detail in FIGS. 7 and 8. The manner in which the strips 2 and 3 are interwoven to form the tire will be described later in more detail. The tire 1 in FIGS. 1 and 2 is mounted on a rigid rim 4 of metal or other suitable material having radially outwardly extending flanges 5 and 6 along the opposite edges thereof. The strips 2 and 3 are fastened at each end to the flanges 5 and 6 by bolts 7 passing through holes in the ends of the strips 2 and 3 and in the flanges 5 and 6. Each of the bolts 7 receives one end of one of the strips 2 and one end of one of the strips 3 in overlapping relationship as will be described in more detail later.

An inflatable inner tube 8 having a valve 9 is mounted inside the tire, before it is fastened to the rim, with the valve 9 passing through a hole 10 in the rim 4.

Referring now to FIGS. 5 through 8 which show in greater detail the structure of the two different designs of the strips 2 and 3 used to produce the tire shown in FIGS. 1 and 2, it will be observed that the strips 2 and 3 are similar but have an opposite peripheral contour. This is necessary since the strips 2 and 3 cross the tire at opposite angles to the peripheral centerline of the tire. In order to properly conform to the contour of the tire and fill the outer surface of the tire it is necessary that each strip be made in the form of a modified or elongated S curve having greater width at the center of the strip and tapering progressively toward both ends of the strip. Each end of the strips 2 and 3 have holes 11 therein for bolting the strips to the flanges 5 and 6 of the rim 4.

The strip 2 (FIGS. 5 and 6) has a plurality of spaced raised segments 12 part of which are thickened as indicated by the numeral 12a to serve as the tread portion of the tire. A plurality of depressed segments 12b are located between the raised segments 12 and 12a to form an undulating pattern when the strip 2 is viewed from the side as shown in FIG. 6.

The strip 3 (FIGS. 7 and 8) has a plurality of raised segments 13 part of which are thickened as indicated by the numeral 13a to serve as the tread portion of the tire as do the thickened segments 12a on the strip 2. The strip 3 has depressed segments 13b similar to the segments 12b in the strip 2.

Figure 5:
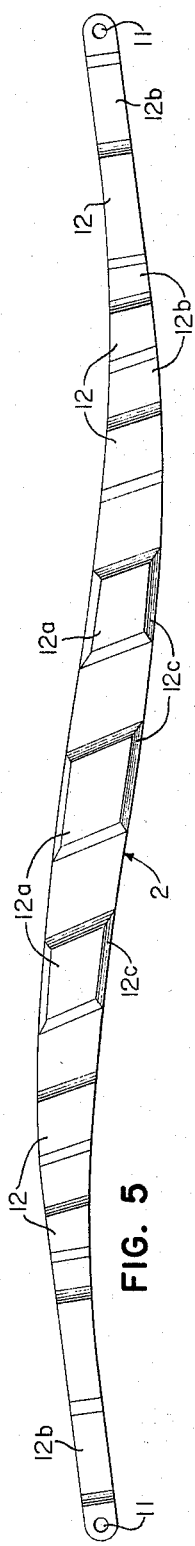
FIG. 5 is a top plan view of one of the molded strips used to make the tires shown in FIGS. 1 through 4.
Figure 6:
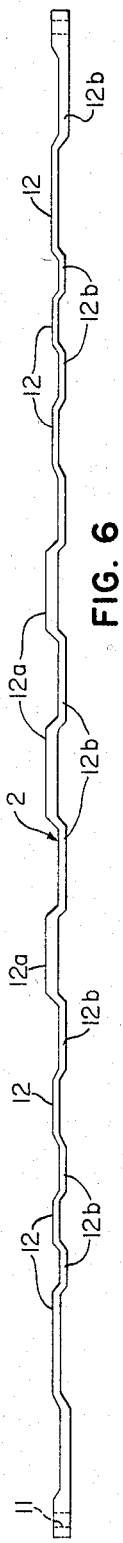
FIG. 6 is a front elevation of the molded strip shown in FIG. 5.
Figure 7:
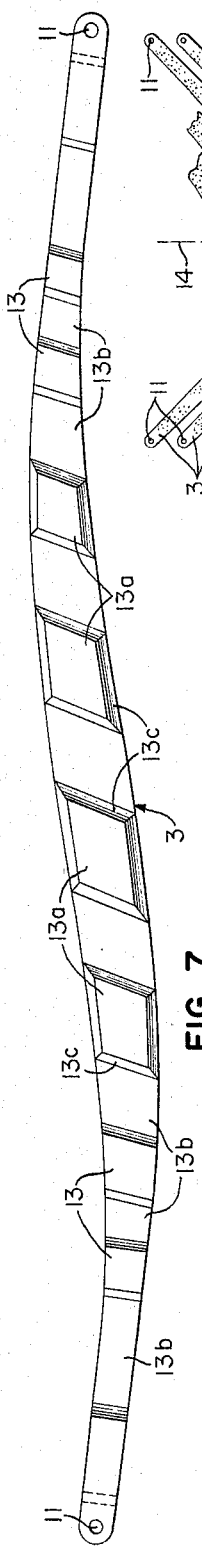
FIG. 7 is a top plan view of a molded strip similar to that shown in FIG. 5 but with an opposite contour.
Figure 8:
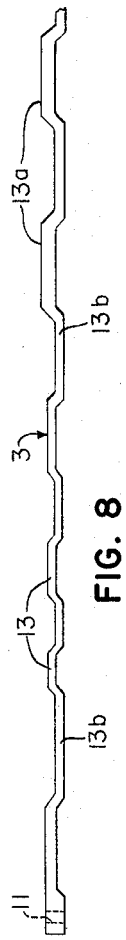
FIG. 8 is a partial front elevation of the molded strip shown in FIG. 7.

By comparing FIG. 5 with FIG. 7, it will be seen that the lateral edges of segments 12, 12a and 12b are inclined at opposite angles from segments 13, 13a and 13b with respect to the longitudinal axis of the strips 2 and 3. It will also be seen that raised segments 12 and 12a of the strip 2 are offset to correspond with and overlie the depressed segments 13b of the strip 3 when assembled. The raised segments 13 and 13a are likewise offset to correspond to and overlie the depressed segments 12b of the strip 2. When the strips 2 and 3 are assembled to form a tire, the outer faces of the thickened segments 12a and 13a are on the same level. The beveled edges 12c and 13c of the segments 12a and 13a provide grooves 13d therebetween (FIG. 3) to give the tire better traction.

Figure 9:
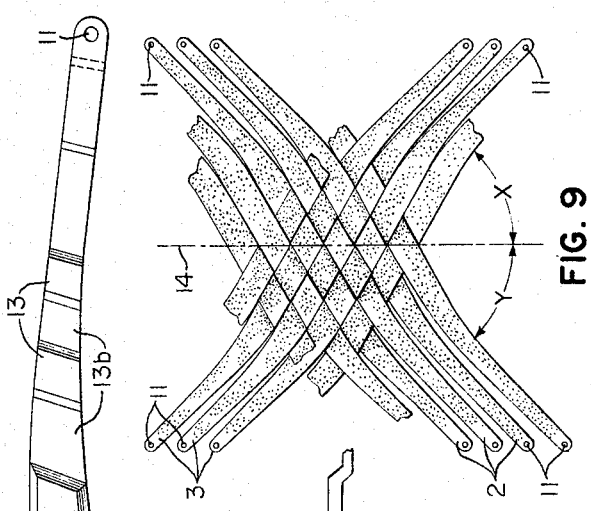
FIG. 9 is a fragmentary diagrammatic view showing how some of the molded strips of FIG. 5 are interwoven with some of the molded strips of FIG. 7.

As shown in FIG. 9, the strips 2 and 3 are interwoven in a basket weave pattern with all the strips 3 lying at an angle X with respect to the peripheral centerline 14 of the tire and all the strips 2 lying at an angle Y with respect to the peripheral centerline 14. Usually it is desirable that angle X and Y be equal. In the present form of this invention both angle X and Y are 55°. Both the strips 2 and 3 are molded to follow a modified geodesic path so that when they cross the centerline 14 at 55° the ends of the strips 2 and 3 when bolted to the rim flanges 5 and 6 (FIGS. 1 and 2) approach the periphery of the flanges at approximately 40°. Each bolt 7 receives an end of one of the strips 2 and an end of one of the strips 3 in overlapping relationship. The strips 2 and 3 approach the bolt from opposite angles to the periphery of the flange.

It will be understood that either the molded strips 2 and 3 or flat strips may be interwoven in the manner shown in FIG. 9. It will also be understood that many different sizes of tires can be made from the same size of strips merely by varying the number of strips used. The strips preferably are reinforced with cord or fabric of wire, nylon, rayon or any suitable material.

FIGS. 3 and 4 show another embodiment of the invention in which the strips 2 and 3 are interwoven to form a tire 15 in the same manner described previously in making the tire 1 shown in FIGS. 1 and 2. Instead of fastening the tire to a rigid rim, however, the tire 15 shown in FIGS. 3 and 4 is fastened to a flexible fabric rim 16 shown in FIG. 4. The rim 16 may be made of textile fabric or any other suitable flexible material such as wire, sheet plastic or rubber. The outer periphery of the rim 16 forms a concave channel which receives the inner periphery of an inner tube 17 having an inflation valve 18 passing through a hole 19 in the rim 16.

The rim 16 has a plurality of holes 20 located around both edges of the rim 16 for receiving bolts 21 which pass through the holes 11 in the end strips 2 and 3 to fasten the tire to the rim 16. Each bolt 21 receives an end of one of the strips 2 and an end of one of the strips 3 in overlapping relationship but approaching the bolt from opposite angles to the periphery of the flange in the same manner as described for fastening the strips 2 and 3 to the rigid rim 4. Each pair of adjacent bolts 21 also passes through a triangular-shaped plate 22 which has two holes 23 for receiving the bolts 21 and one hole 24 for connecting a plurality of flexible spokes 25 at their outer ends. The plates 22 are circumferentially mounted on the rim 16 with the two holes 23 in each plate positioned radially outwardly from the rotational axis of the tire 15 and with the hole 24 in each plate radially inwardly from the holes 23 and centrally positioned therebetween. The inner ends of the spokes 25 are looped to form connections which are bolted to a disc shaped hub plate 26 by bolts 27 passing through holes 28 arranged circumferentially around the plate 26 near the outer periphery. The spokes 25 may be textile cords, wire or any other suitable material. The spokes 25 support the plate 26 concentrically within the central opening of the tire 15. The hub plate 26 also has a plurality of holes 29 located circumferentially inwardly from the holes 20 for fastening it to a wheel hub not shown.

It will be seen in FIG. 3 that each pair of spokes 25 coming from a common hole 24 in each plate 22 are connected to two of the bolts 27 which are four bolt spaces apart from each other at such distance to form a V shaped connection which will provide circumferential stability between the tire and the plate 26. It will be obvious that other spacing arrangements of the spokes 25 can also be used. In FIG. 4 it will be observed that spokes 25 connecting each side of the tire 15 with the hub plate 26 form another V shaped connection to further provide stability in the tire mounting.

With the tire 15 joined to the hub plate 26 by the flexible spokes 25 in the manner heretofore described, the tire, when deflated, may be folded compactly around the hub plate 26 or a wheel if it is mounted on a vehicle. Upon inflation the tire 15 assumes a torroidal shape and pulls outwardly on the spokes 25, thereby tensioning them to provide a rigid spoke assembly between the tire 15 and the hub plate 26.

There are, of course, many ways of fastening an interwoven tire of the type described, to a rim or wheel and the invention is not limited to the specific mounting means described heretofore.

While certain representative embodiments and details have been shown for the purpose of illustrating this invention, it will be apparent to those skilled in the art that various changes and modifications may be made therein without departing from the spirit or scope of the invention.

What is claimed is:

1. In a vehicle tire and rim assembly which includes a rigid rim having a radially outwardly extending flange along each of the opposite edges thereof, a tire structure mounted on said rim and an inflatable air retaining tube confined in the chamber formed by the interior of said tire and said rim, the improvement comprising a tire formed of two sets of strips of elastomeric material, each set having a plurality of substantially identical preformed vulcanized strips, the strips of each set extending at a substantial angle to the peripheral center line of the tire with the angle of one set being the same but opposite to that of the other and the vulcanized strips woven in a basket weave and fastening means removably attaching the ends of said strips to the rim flanges.

2. A tire construction as claimed in claim 1 in which each strip of the assembled tire lies in a substantially geodesic path.

3. A tire construction as claimed in claim 1 in which the ends of or strip of each set are in supper-imposed relationship and are attached by a single means to the wheel structure.

4. A construction for an open-bellied tire comprising two sets of flexible elastomeric strips, each set having a plurality of preformed vulcanized strips extending from one side of the tire to the other at a substantial angle to the peripheral center line of the tire, with the angle of one set being the same but opposite to that of the other set and the vulcanized strips of one set interlaced with the vulcanized strips of the other in a basket weave to form an integrated structure.

5. A tire as claimed in claim 4 in which each preformed vulcanized strip includes along the length thereof a multiplicity of spaced raised portions on the surface to form a substantially uniform outer tread surface on the tire when in the assembled position.

6. A tire construction as claimed in claim 5 in which the raised portions are formed on the sections of each strip overlying the space between the raised portions of the oppositely extending strips in the basket weave whereby the tire surface is substantially uniform.

7. A tire construction as claimed in claim 5 in which each strip is formed and vulcanized in a mold with the strips of one set having an opposite peripheral contour to those of the other.

8. A construction for an open-bellied tire comprising two sets of flexible strips having longitudinal reinforcement material incorporated therein, each set including a plurality of identical vulcanized strips lying in parallel relationship to form an annulus of C-shaped cross-section with the opening lying along the inner periphery of the annulus, the strips extending from one inner edge of the annulus to the other inner edge at an angle oblique to the peripheral center line of the tire, the angles of the sets being substantially identical but opposite with the opposite ends of the strips forming the spaced inner edges of the annuulus and the vulcanized strips being woven in a basket weave to form a unitary structure.

9. A construction for an open-bellied tire comprising two sets of flexible strips having longitudinal reinforcement material incorporated therein, each set including a plurality of identical vulcanized strips assembled in parallel relationship to form an annulus of C-shaped cross-section with the opening lying along the inner periphery of the annulus, the strips extending from one inner edge of the annulus to the other inner edge at an angle oblique to the peripheral center line of the tire, the angles of the sets being substantially identical but opposite with the opposite ends of the strips forming the spaced inner edges of the annulus, and means on each end of each strip to attach said strips to a supporting structure.

10. A pneumatic tire comprising: a plurality of cured elastomeric flexible strips interwoven to form a casing for retaining an inner tube, means removably attached to the ends of at least part of the cured strips for retaining the strips in a predetermined relationship to each other, and means for attaching the retaining means to a wheel.

11. A tire as claimed in claim 10 in which each strip has longitudinal reinforcement material incorporated therein.

12. A tire as claimed in claim 10 in which the interwoven strips form an annulus of C shaped cross section with the opening lying along the inner periphery of the annulus.

13. A tire as claimed in claim 10 in which the strips are interwoven in a basket weave pattern with all the strips extending from one side of the tire to the other at a substantial angle to the peripheral center line of the tire.

14. A vehicle tire and rim assembly for use on a wheel hub comprising: a tire formed of two sets of elastomeric strips each set having a plurality of substantially identical preformed strips, the strips of each set extending at a substantial angle to the peripheral center line of the tire, with the angle of one set being the same but opposite to that of the other and the strips being woven in a basket weave patern; a flexible rim; means removably attaching the ends of the strips to the rim; a hub plate; and a plurality of flexible spokes concentrically connecting the hub plate to the rim so that when the tire is deflated, said tire, rim and spokes fold compactly around the wheel hub and upon inflation the tire and rim assume an annular shape and the spokes are put in tension and rigidly support the hub plate centrally of the tire and rim.

References Cited by the Examiner
UNITED STATES PATENTS

| 1,333,915 | 3/1920 | Hall | 152—385 X |
| 1,343,368 | 6/1920 | Kinsley | 152—358 X |
| 1,423,771 | 7/1922 | McLeod | 152—358 |
| 2,370,790 | 3/1945 | Glasser | 152—190 |

FOREIGN PATENTS 345,930   1920   Germany.

ARTHUR L. LA POINT, *Primary Examiner.*

C. W. HAEFELE, *Assistant Examiner.*